United States Patent Office 2,764,753
Patented Sept. 25, 1956

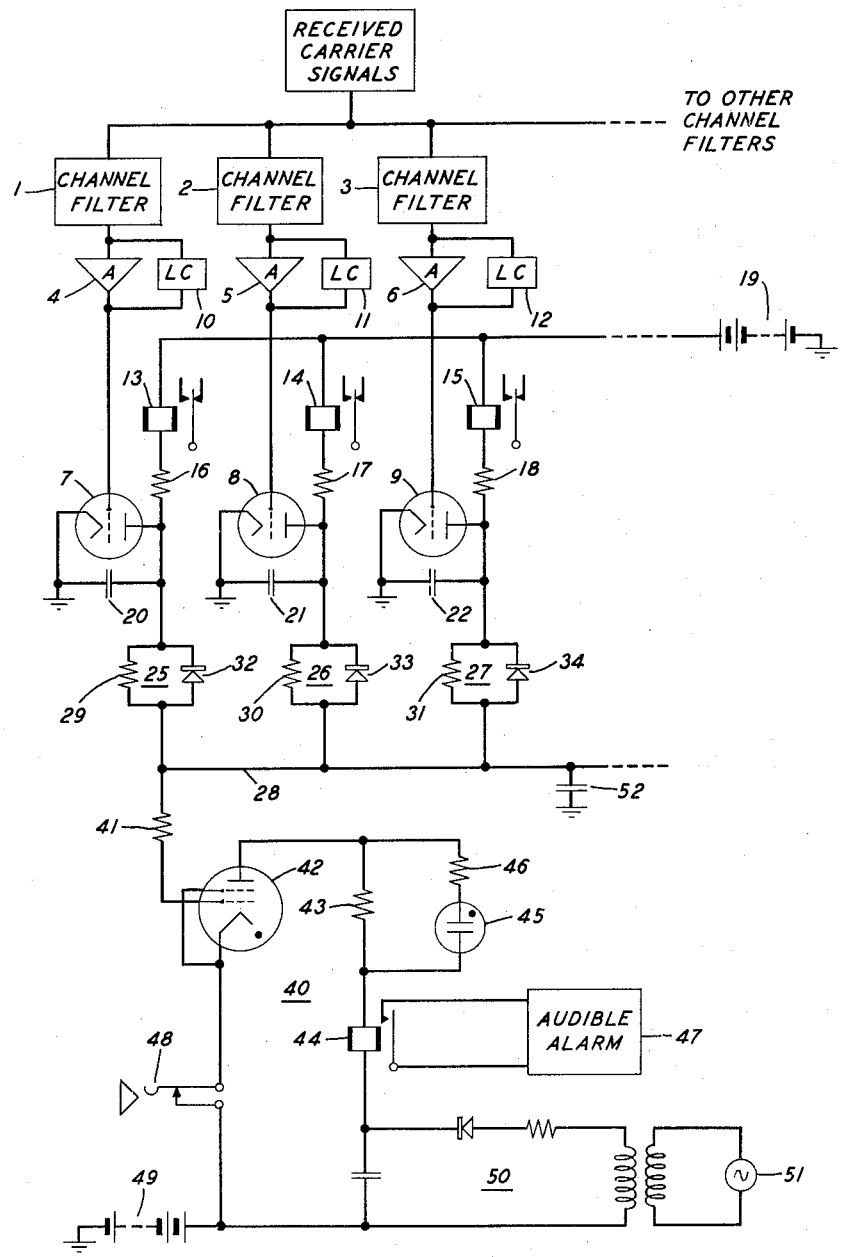

2,764,753

CARRIER FAILURE ALARM CIRCUIT

Wade B. Martin, Ramsey, N. J., assignor to American Telephone and Telegraph Company, a corporation of New York Application January 24, 1955, Serial No. 483,592

4 Claims. (Cl. 340—253)

This invention relates to multichannel signal transmission arrangements and more particularly to circuits therein for indicating the interruption of transmission on a plurality of the channels.

In certain multichannel signal transmission arrangements, such as those used, for example, to transmit telegraph signals, many channels, 6 to 36 in present telegraph usage, are grouped together in a common transmission facility to form a "system." The system may extend between just two terminals, or it may be subdivided to permit joint usage at intermediate terminals and to permit channels to be dropped. The number of channels provided between different geographical locations will depend on traffic requirements and the need for diversification.

A fault which disables all of the channels in a multichannel system, as distinguished from a fault which disables less than all of the system channels, is called a "hit." A hit can be caused by such things as an actual physical interruption of the medium carrying the channels, improper operation of equipment by personnel, or the occurrence of a particular type of interference which would substantially attenuate the signals on all channels.

Some arrangements of relay devices of the electromagnetic variety have been suggested to indicate a simultaneous fault on a plurality of communication channels. Such arrangements are satisfactory where a relatively small number of channels are involved, such as three to five channels, and where a single type of communication channel is involved. However, when a large number of channels are involved, such as in the various carrier communication arrangements, the construction of electromagnetic fault indicators and the design values assigned to other components in the hit indicator circuit become critical. Electromagnetic hit indicators are also relatively slow in operation and would not detect an intermittent failure of short duration.

It is therefore an object of this invention to facilitate the detection of the simultaneous interruption of signal transmission in all channels of a multichannel system.

It is a further object of the invention to obtain a reliable indication of the interruption of transmission on all of the channels in a communication system.

In carrying out this invention in an illustrative embodiment thereof, monitor leads, including a resistor and a rectifier connected in parallel, join the plate circuit of a detector in each channel to a common junction point. An alarm is energized by the change in potential of the common junction point upon the failure of all of the channels. As each detector is cut off by the failure of its signal supply, current from the detector power supply leaks through the monitor lead associated with that detector, the common junction point, the detector and monitor lead of any detectors in the system which may still be conducting, and back to the power supply. When all detectors in the system have been cut off by failure of their signal supply there will be no leakage from the common junction point to the power supply so the potential thereof will jump to the value of the detector plate supply voltage and trigger the alarm circuit. Further in accordance with the present invention, the location of any one hit can be approximately determined by comparing all of the hit indications obtained at a particular time with a map of the systems that are monitored by hit indicators.

The arrangement and operation of this invention will be apparent from the following specification and the illustration in the single sheet of drawing. The invention is applicable to any arrangement having a plurality of signal transmission paths wherein it is necessary to indicate the interruption of all of a given number of paths, but a voice frequency carrier telegraph system has been chosen to illustrate the invention.

Referring to the drawing, the various channels in the carrier system are selected from the composite signal by channel filters 1, 2 and 3. The amplifiers 4, 5 and 6 raise the power level of the signals in each channel and the detectors 7, 8 and 9 derive the intelligence from the respective modulated carrier frequencies. Each of the channels may be level compensated by suitable devices 10, 11 and 12 such as the type shown and described in the United States Patent 2,182,841 to Davey and Hysko. If level compensation is employed the alarm system described herein will also be affected by the level compensation so that the effects of telegraph bias will not cause a false hit indication.

The relays 13, 14 and 15 are schematic representations of devices for translating the electrical signals into the marks and spaces which are characteristic of telegraph communication. Load resistors 16, 17 and 18 are provided in the plate circuit of each detector. A source of potential 19 represents the common source of plate supply voltage for all of the detectors. The capacitors 20, 21 and 22 connected in parallel with detectors 7, 8 and 9, respectively, serve as filter capacitors to smooth out the effects of half-wave rectification in the detectors to give more reliable operation of relays 13, 14 and 15.

The plate circuit for each channel detector includes the plate load resistor and the relay associated therewith. In the illustrative embodiment of this invention the channels are monitored for the purposes of hit indication by connecting the monitoring circuits 25, 26 and 27 to the plate circuits of detectors 7, 8 and 9, respectively, at the plate terminal of each detector. The monitor circuits for all of the channels embraced in the system which is to be monitored for hit indication purposes are connected to a common junction point such as the hub circuit 28. The monitor circuits include series resistors 29, 30 and 31, the impedance of each of which is large compared to the conducting impedance of its associated detector tube. Each monitor circuit also includes a unilaterally conducting impedance device such as the varistors 32, 33 and 34 connected in parallel with resistors 29, 30 and 31, respectively. The varistors are poled to conduct away from hub circuit 28.

An alarm circuit 40 is connected to hub 28 through resistor 41 which is connected to the control grid of a gas-filled tube such as the thyratron 42. The load resistor 43 and the relay 44 are serially connected in the plate circuit of thyratron 42. A glow discharge tube 45 serves as a visual alarm and is responsive to the potential drop across resistor 43. Resistor 46 limits the current through tube 45. Any suitable audible alarm 47 can be arranged in circuit relationship with relay 44 to be energized upon the firing of thyratron 42. Switch 48 is connected in series with the plate-cathode circuit of thyratron 42 so that the circuit can be manually interrupted to reset the alarms after a hit on the system. A source of voltage 49 is connected to the cathode of thyratron 42 to bias thyratron 42 beyond cut off. Source 49 should be approximately equal to, or somewhat less than, source 19 to provide proper triggering of thyratron 42. The functions performed by source 19 and source 49 could be performed by a single source but two sources have been shown for convenience in illustration. A rectifier and filter circuit 50, energized by the A. C. source 51, provides plate supply potential for thyratron 42.

Gas-filled tube 42 is used in the alarm circuit because of its rapid response to triggering potential. In some multichannel communication systems using detectors of the type shown in Fig. 1, the response of a thyratron may be too rapid, even with capacitors connected in parallel with the channel detectors. For this reason, it may be desirable to connect a capacitor 52 between hub circuit 28 and ground to increase the response time of the alarm circuit 40 and thus avoid false triggering.

In describing the operation of the hit indicator it is convenient to assume values for sources 19 and 49. For this purpose it is assumed that each source is 130 volts, but of course different values can be used and the circuit components proportioned accordingly.

When all channels of the system are conducting, all of the detectors will be conducting. In this condition hub 28 is at approximately the same potential as the detector plate terminals. This is about 112 volts and is insufficient to overcome the 130 volt bias on thyratron 42.

Assuming next that detectors 7 and 8 are cut off by the interruption of transmission on the channels with which they are associated, the potential of hub 28 will rise to approximately 115 volts by virtue of the decreased current flowing in the plate circuits of these detectors. The potential of hub 28 does not rise to the terminal voltage of source 19 because a leakage path for current from the plate circuit of detector 7 to ground is provided by resistor 29, hub circuit, varistor 34 and detector 9. There is a similar leakage path from the plate circuit of detector 8 through its monitor circuit 26. Hub circuit 28 will remain at substantially 115 volts as long as there is at least one detector conducting to complete a leakage path from the other monitor leads through the hub circuit and the monitor circuit of the conducting detector to ground. The impedances of resistors 16, 17 and 18 are large enough to prevent any appreciable change in signal current in a conducting detector as a result of failure of conduction in another detector.

If it is assumed that detector 9 is in the last channel in the system to be cut off, when it is cut off there is no longer a leakage path from hub 28 to ground and the potential of hub 28 will rise to 130 volts, the terminal voltage of source 19. This value is high enough to overcome the bias applied by source 49, and thyratron 42 will be triggered into conduction. When thyratron 42 has been triggered visual alarm 45 will be actuated as soon as the potential drop across resistor 43 rises to the firing voltage of tube 45, and audible alarm 46 will be actuated as soon as relay 44 picks up. An attendant may then initiate remedial measures. The alarms may be reset by manually operating switch 48.

It is possible in the type of system herein described that the occurrence of a space signal simultaneously on all channels of the system would cause the alarm to be triggered since that is equivalent to cutting off all of the detectors. This possibility is extremely remote however, particularly in systems having a large number of channels. If such a hit should occur it would be treated the same as an intermittent fault since there is no practical way to distinguish the two.

The hit indicator which comprises the present invention has been described in connection with three channels of a voice frequency carrier telegraph system. It should be evident that such an indicator is equally applicable to any electric circuit using two, three, or more, channels wherein the interruption of conduction over all of the channels of the circuit will cause a substantial voltage change at some point in the circuit where the monitor leads can be connected. Likewise any alarm circuit responsive to such voltage change could be used. The monitor leads can be connected to any such point in the individual channels, and they have been shown as being connected in the detector plate terminals for the purpose of illustration. Other advantages and modifications of the invention will be apparent to those skilled in the art, and they are intended to be included within the scope of this invention as described in the following claims.

What is claimed is:

1. In combination with an electric signal communication system having a plurality of channels each including a signal detecting electron discharge device with an associated plate circuit, and a source of potential connected to all of said plate circuits, improved alarm means for indicating the simultaneous failure of signal transmission on all of said channels comprising a plurality of resistors, a separate rectifying device connected in parallel with each of said resistors, a plurality of monitor circuits each including a different one of said resistors and rectifying devices and connected between a different one of said plate circuits and a common junction point, an alarm device connected to said junction point, the impedance of said resistors being so proportioned with respect to the conducting impedance of said detectors and said rectifying devices being so poled that said alarm device will be actuated only upon the simultaneous disabling of all said detector tubes.

2. In an electric signal communication circuit having a plurality of signal transmission paths each of which includes a different signal translating device having a terminal which is subjected to a change in voltage impressed thereon from a source of potential, said change occurring in response to the failure of signal energy transmission in the path connected to said device, a plurality of resistors, a plurality of monitor leads, each including a different one of said resistors, each of said monitor leads having one end thereof connected to a different one of said terminals, the other ends of all of said leads being connected to a common junction point, a separate asymmetrically conducting device connected in parallel with each of said resistors and poled to conduct from said common junction point toward the associated translating device terminal, the reverse impedance of each said asymmetrically conducting devices being high compared to the resistance of any one of said resistors, circuit means connecting each of said terminals and said translating devices, but excluding said monitor leads, in a separate series circuit which is in turn connected in parallel with said source, the impedance of each of said resistors being of such value that there will be substantially no change in signal current in a signal transmission path as a result of the failure of signal energy transmission in another path, alarm means, means coupling said common junction point to said alarm means, means including said coupling means for actuating said alarm means only in response to the increase in voltage on said common junction point upon the simultaneous failure of signals in all of said paths.

3. In a carrier communication system wherein a plurality of communication channels are provided and separate filters, amplifiers and electron discharge device detectors are provided to separate the signals from the carrier frequencies, and wherein alarm means are provided to indicate the simultaneous disabling of all of said detectors, the improvement in circuit means for monitoring said detectors to control said alarm means comprising a source of potential, circuit means connecting each of said detectors in a separate loop including said source of potential, a plurality of resistors each having one terminal thereof connected to a different one of said loops at a point intermediate said detector and said source, circuit means connecting the opposite terminals of said resistors to a common junction point, a separate unilaterally conducting impedance device connected in parallel with each of said resistors and poled to conduct away from said common junction point, the impedance of each of said resistors being much greater than the impedance of one of said loops but smaller than the reverse impedance of the corresponding unilaterally conducting impedance device, means coupling said alarm to said common junction, means including said coupling means for actuating said alarm only in response to the change in potential of said common junction upon the simultaneous disabling of all of said detectors.

4. The communication system recited in claim 3 wherein said alarm means comprises an electron discharge device having anode, cathode and grid electrodes, means connecting the grid electrode thereof to said common junction, an anode-cathode circuit connected to said discharge device, an alarm device connected to said anode-cathode circuit, and bias means connected to said anode-cathode circuit to hold said discharge device nonconducting until the potential of said common junction point rises to the potential of said source.

References Cited in the file of this patent

UNITED STATES PATENTS

| | | |
|---|---|---|
| 2,193,093 | Gardner | Mar. 12, 1940 |
| 2,336,362 | Mahoney | Dec. 7, 1943 |
| 2,708,216 | Doerrfeld | May 10, 1955 |